US007221550B2

(12) United States Patent
Chang et al.

(10) Patent No.: US 7,221,550 B2
(45) Date of Patent: May 22, 2007

(54) SURGE PROTECTION DEVICE AND METHOD

(75) Inventors: Byung-Ho Chang, Suwon-si (KR); Yong-Woo Kim, Seoul (KR); Alexandr Vasilievich Garmonov, Russian Federation (RU); Alexandr Victorovich Gluschenko, Russian Federation (RU); Yaroslav Vladimirivich Grischuk, Russian Federation (RU); Vladimir Ivanovich Grischuk, Russian Federation (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 305 days.

(21) Appl. No.: 10/712,774

(22) Filed: Nov. 14, 2003

(65) Prior Publication Data

US 2004/0145849 A1 Jul. 29, 2004

(30) Foreign Application Priority Data

Nov. 15, 2002 (RU) .............................. 2002130595

(51) Int. Cl.
*H02H 9/00* (2006.01)

(52) U.S. Cl. ....................................... 361/118; 361/119

(58) Field of Classification Search ............... 361/91.1, 361/56, 110, 111, 118–119
See application file for complete search history.

(56) References Cited

U.S. PATENT DOCUMENTS

| | | | | |
|---|---|---|---|---|
| 4,571,656 | A * | 2/1986 | Ruckman | 361/56 |
| 5,390,337 | A * | 2/1995 | Jelinek et al. | 725/128 |
| 5,978,199 | A * | 11/1999 | Germann et al. | 361/119 |
| 6,529,357 | B1 * | 3/2003 | Landinger et al. | 361/91.1 |
| 2005/0243493 | A1 * | 11/2005 | Inauen | 361/118 |

* cited by examiner

*Primary Examiner*—Stephen W. Jackson
(74) *Attorney, Agent, or Firm*—Roylance, Abrams, Berdo & Goodman, L.L.P.

(57) ABSTRACT

A device and method are disclosed for protecting a wireless communication system from impulse surges occurring in the system under the impact of lightning discharges. The device includes a high frequency line, and a first decoupling filter formed as a λ/4 section and a gas arrestor, sequentially connected to the high frequency line, in which the gas arrestor is connected between the first decoupling filter and the ground. A low frequency line and a second decoupling filter are connected in series between an output terminal, through which a signal flows into a circuit, and a contact point between the first decoupling filter and the gas arrestor. The low frequency line includes a low voltage limiter and a low pass filter. A T-shaped high pass filer is connected to the high frequency line.

20 Claims, 4 Drawing Sheets

SURGE PROTECTION DEVICE AND METHOD

PRIORITY

This application claims priority to an application entitled "SURGE PROTECTION DEVICE", filed in the Russian Patent Office on Nov. 15, 2002 and assigned Serial No. 2002130595, the contents of which are incorporated herein by reference.

BACKGROUND OF THE INVENTION

1. Field of the Invention

The present invention relates to a device and method for protecting a system against lightning, and more particularly to a device for protecting a wireless communication system from impulse surges occurring in the system under the impact of lightning discharges.

2. Description of the Related Art

A general wireless communication system includes a mobile switching center (MSC), a plurality of base station controllers (BSCs) connected downstream of the mobile switching center, and a plurality of base transceiver stations (BTSs) connected downstream of each base station controller. In the wireless communication system, the mobile switching center and the base station controller are, in most cases, positioned inside a building. It is possible to protect the system from impulse surges using a lightning discharge protection device located in the building, which employs elements for preventing impulse voltage of a relatively low electric field that may occur in cables.

On the other hand, the base transceiver stations (hereinafter referred to as "base stations") connected downstream of a base station controller are in most cases installed outside the building in order to communicate with wireless terminals. When the base stations are installed outside a building in this manner, it is essential to protect them against lightning because the base stations have a wireless antenna and thus very weak resistance to lightning. In other words, if lightning occurs, it may induce a transient high-voltage current through the base station's antenna, which is highly likely to damage the base station system because the base station system is composed of semiconductor elements. For this reason, various surge protection devices have been developed to protect the base station devices from lighting.

An arrestor is generally used as the surge protection device, which is classified into the following four types. The first type is an arrestor using a high pass filter, the second is an arrester using a gas capsule, the third is a λ/4 shorting stub arrestor, and the fourth is an arrestor using a semiconductor Transient Voltage Suppressor (TVS). These arrestors have the following problems.

First, the arrestor using the high pass filter has a problem in that it has a high residual pulse level due to a high inductance value. In other words, the arrestor's inductance provides a very high resistance against high frequency signals, but a residual pulse occurs after the high frequency signals are input.

Second, the arrestor using the gas capsule does not operate for surges having a voltage lower than a dynamic spark-over voltage. However, the dynamic spark-over voltage is a very high voltage of 900V in general. Since the dynamic spark-over voltage is set very high, this arrestor does not operate for overvoltages lower than the spark-over voltage, for example, 500V or 600V. This arrestor thus has a problem in that, when adapted for a base station composed of semiconductor elements, it cannot protect the system from the non-activating overvoltages.

Third, the λ/4 shorting stub arrestor has excellent performance in terms of all characteristics. However, it is difficult to use this arrestor in a base station system since its stub is short-circuited to the ground. Specifically, a DC current must be supplied through an antenna feeder line because the base station system operates while employing amplifiers next to an antenna provided in the system. In other words, since a power amplifier for transmission and a low noise amplifier (LNA) for reception are positioned next to the antenna, it is required to supply DC current. However, since the stub is short-circuited to the ground, the resistance of the stub and the ground is very low, making it difficult to supply the DC current.

Fourth, the arrestor using the semiconductor TVS has no resistance to high currents since it uses the semiconductor element. Thus, it is practically impossible for this arrestor to protect a system from a lightning strike if the lightning current directly enters the system.

One example of the above devices will now be described with reference to FIG. 1. FIG. 1 shows a prior art device disclosed in U.S. Pat. No. 5,978,199 entitled "EMP-Charge-Eliminator", issued on November 1999, which is incorporated herein by reference. This device will also be referred to as a "prototype".

As shown in FIG. 1, the device includes a high frequency line 3 that connects input and output terminals 1 and 2. In addition, a decoupling filter 4 and a gas arrestor 5 are connected in series between the high frequency line 3 and the ground. The decoupling filter 4 include λ/4 lines, where λ is the central passband wavelength thereof.

The device will now be described with reference to FIG. 1. If a surge impulse having an amplitude reaching a response voltage of the arrester 5 is input to the input terminal 1, the impulse voltage signal flows to the arrestor 5 through the decoupling filter 4. As input to the arrestor 5, the impulse voltage becomes an effecting impulse, which then flows into the ground. In this manner, the device prevents overvoltage signals from flowing into the circuit when an overvoltage impulse occurs. On the other hand, if there is no overvoltage, the impact of the arrestor 5 on the high frequency line 3 is neutralized by the decoupling filter 4 composed of several λ/4 sections. The circuit shown in FIG. 1 enables operation of equipment in any frequency range up to 18 GHz.

The gas arrestor 5 in the circuit shown in FIG. 1 can be used in the frequency range below 2 GHz, but cannot limit voltage surges below 100–200 V. The circuit thus has a problem in that it cannot protect the semiconductor antenna amplifiers.

SUMMARY OF THE INVENTION

Therefore, the present invention has been made in view of the above problems, and it is an object of the present invention to provide an arrestor device and method capable of protecting semiconductor elements.

It is another object of the present invention to provide an arrestor device and method that has a wide operating range and can additionally supply DC power.

It is yet another object of the present invention to provide a highly efficient device and method for ensuring lightning protection of high frequency amplifiers, AC/DC voltage being supplied via a feeding cable.

In accordance with an embodiment of the present invention, the above and other objects can be accomplished by the provision of a surge protection device and method for protecting equipment from impulse surges, said device comprising a high frequency line, and a first decoupling filter formed as a λ/4 section and a gas arrestor, sequentially connected to the high frequency line, said gas arrestor being connected between the first decoupling filter and the ground, wherein said device further comprises: a low frequency line and a second decoupling filter connected in series between an output terminal, through which a signal flows into a circuit, and a contact point between the first decoupling filter and the gas arrestor, said low frequency line including a low voltage limiter and a low pass filter; and a T-shaped high pass filer connected to the high frequency line.

Preferably, the low voltage limiter includes a two-directional diode whose breakdown voltage is equal to a supply voltage to be provided to a stage subsequent to the output terminal.

Preferably, the low pass filter in the low frequency line is formed to be able to withstand voltage of surges occurring due to breakdown of the gas arrestor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
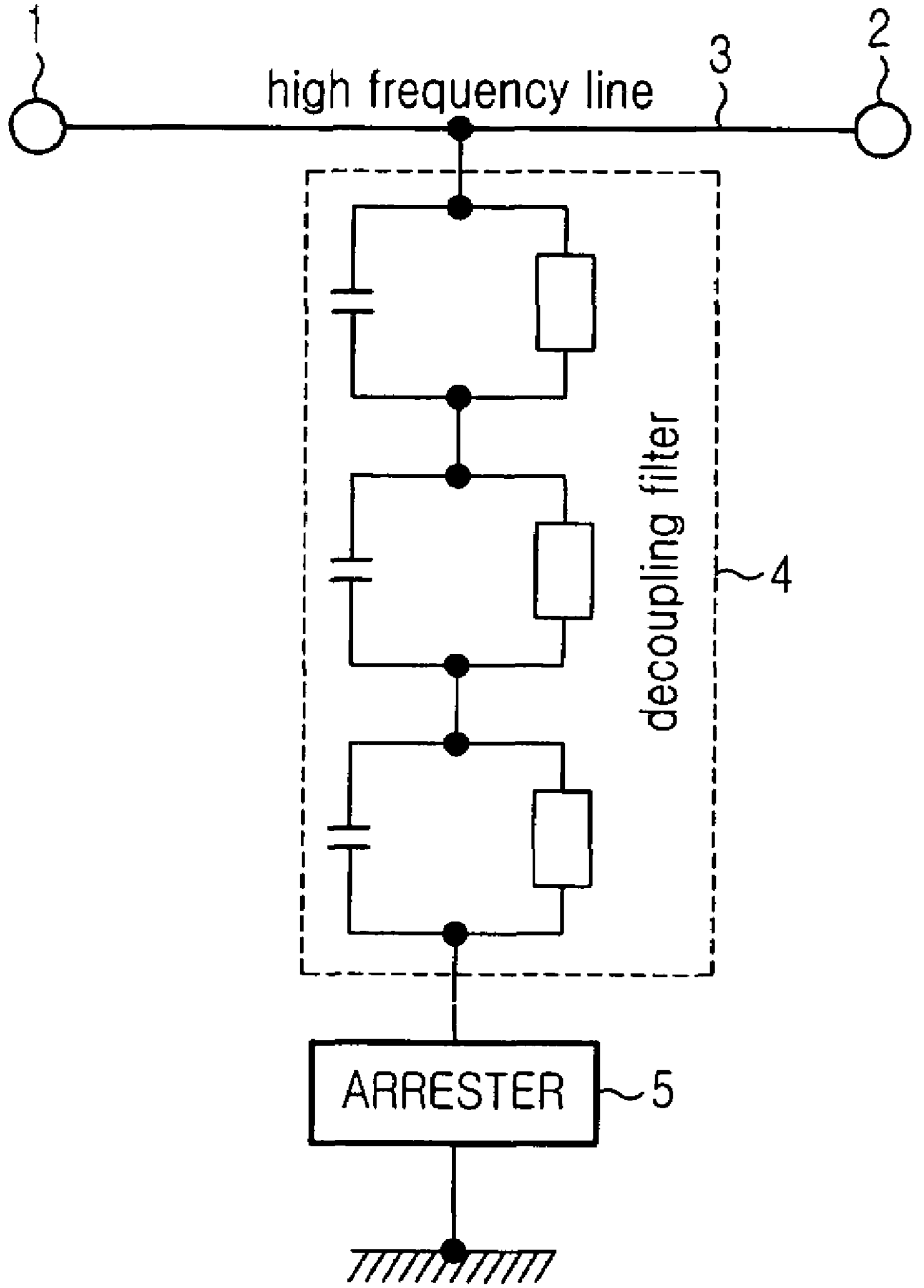
FIG. 1 is a block diagram illustrating an example of a conventional protection device.

Embodiments of the present invention will be described in detail with reference to the accompanying drawings. In the drawings, the same or similar elements are denoted by the same reference numerals even though they are depicted in different drawings.

In the following description made in conjunction with embodiments of the present invention, a variety of specific elements such as detailed constituent elements are shown. The description of such elements has been made only to provide an example of the present invention. Those skilled in the art will appreciate that embodiments of the present invention can be implemented without using the above-mentioned specific elements.

Figure 2:
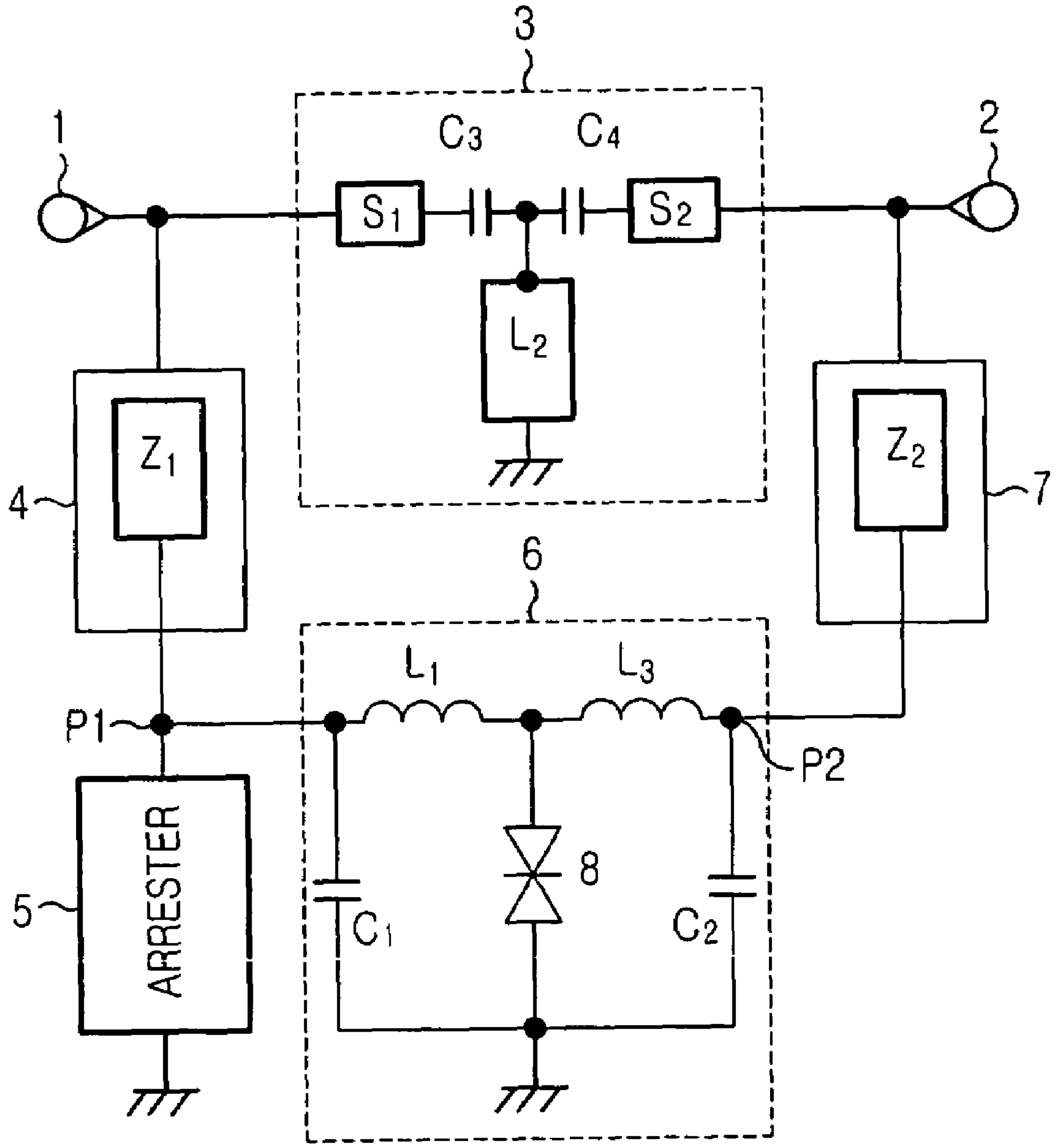
FIG. 2 is a circuit diagram illustrating an example of a surge protection device according to an embodiment of the present invention.

FIG. 2 is a circuit diagram illustrating an example of a surge protection device according to an embodiment of the present invention that can prevent surge voltage and supply DC power. A description will now be given of the configuration and operation of the device according to the embodiment of the present invention, with reference to FIG. 2.

Reference numeral 4 in FIG. 2 denotes a first decoupling circuit similar in operation to the decoupling filter in the prior art described above with reference to FIG. 1. A gas arrestor 5 connected downstream of the first decoupling circuit 4 is similar in operation to the gas arrestor described above in the prior art. As shown in FIG. 2, a band pass filter according to the embodiment of the present invention is provided on a high frequency line 3. The filter is formed in such a manner that a first strip line $S_1$, a third capacitor $C_3$, a fourth capacitor $C_4$ and a second strip line $S_2$ are connected to an output terminal 2. In addition, a second inductance coil $L_2$ is connected between the ground and a contact point between the third and fourth capacitors $C_3$ and $C_4$.

In addition, a low frequency line 6 and a second decoupling circuit 7 are connected between the output terminal 2 and a contact point between the first decoupling circuit 4 and the gas arrestor 5. In the following description, the contact point between the first decoupling circuit 4 and the gas arrestor 5 is refer red to as a "first contact point P1", and the contact point between the low frequency line 6 and the second decoupling circuit 7 is referred to as a "second contact point P2". A first capacitor $C_1$ is connected between the first contact point P1 and the ground, and a second capacitor $C_2$ is connected between the second contact point P1 and the ground. In addition, first and third inductance coils $L_1$ and $L_3$ are connected in series between the first and second contact points P1 and P2. A semiconductor limiter 8 is connected between the ground and a contact point between the first and third inductance coils $L_1$ and $L_3$.

A description will now be given of the operation of the device with reference to FIG. 2. In general, mobile communication system signals of a predetermined frequency band and DC power are input to the input terminal 1. The DC power current cannot flow into the high frequency line 3 since it is a very low or zero frequency signal. Accordingly, the signal flows into the output terminal 2 via the first decoupling filter 4, the low frequency line 6 and the second decoupling filter 7. On the other hand, a high frequency signal input to the input terminal 1 flows into the output terminal 2 via the high frequency line 3, and thus via the third and fourth capacitors $C_3$ and $C_4$, since the inductance provides very high impedance for high frequency signals. If a signal input to the input terminal 1 has a frequency that allows it to pass through the third capacitor $C_3$, but not through the fourth capacitor $C_4$, it flows into the ground via the second inductance coil $L_2$.

If a high voltage surge flows into the device, the decoupling filter 4 and the gas arrestor 5 operate to prevent the inflow of the high voltage signal at high frequency in the same manner as in the prior art. However, for high voltage signals of 100 to 200 V, as describe above in the prior art, the device performs the inflow prevention operation in two different manners, respectively, when they are high frequency signals and when they are low frequency signals. First, when the high voltage signal is a low frequency signal, it is input to the low frequency line 6. The limiter 8 limits the inflow voltage based on the conductivity threshold thereof. In other words, when a voltage higher than the threshold flows in the circuit, the limiter 8 is turned on. The turn-on voltage of the limiter 8 serves to limit the inflow voltage to a voltage range required in the circuit, thereby preventing the inflow of signals having a voltage higher than it. The inductance of the first inductance coil $L_1$ between the arrestor 5 and the limiter 8 is selected to limit currents at a preset acceptable level. In other words, the inductance is selected so that currents flowing in through the limiter 8 satisfy the current limiting condition. The first capacitor $C_1$ in the low frequency line 6 must withstand surges occurring due to breakdown of the gas arrestor 5, when the arrestor 5 is in operation.

On the other hand, high frequency signals are limited through the high frequency line 3. The high frequency line 3 comprises the capacitors $C_3$ and $C_4$, highly reliable ceramic capacitors capable of bearing overvoltages occurring prior to the breakdown of the arrester 5, and the inductance coil $L_2$. Accordingly, high voltage signals occurring prior to the breakdown are blocked at the high frequency line 3, which allows signals input through the antenna to flow into the output terminal 2 while minimizing the signal loss.

The first and second decoupling filters 4 and 7 comprise λ/4 sections $Z_1$ and $Z_2$, (i.e., sections of a λ/4 strip line), respectively, where λ denotes the central passband wavelength. The strip line section of the decoupling filter 4 must be designed to allow short-circuit currents to flow when overvoltage wave signals flow in. It should be noted that the requirement to allow the flow of short-circuit currents is not essential for the decoupling filter 7.

The negative effect on high frequency channels is neutralized as described above. In addition, galvanic coupling of input to output needed to transmit supply voltage of the antenna amplifier is provided. Further, induced voltage impulses in the circuit at the next stage under protection of the surge protection device are limited at the minimum level.

The operation of the surge limiting device of FIG. 2 will now be described with reference to the oscillograms shown in FIGS. 3 and 4.

Figure 3:
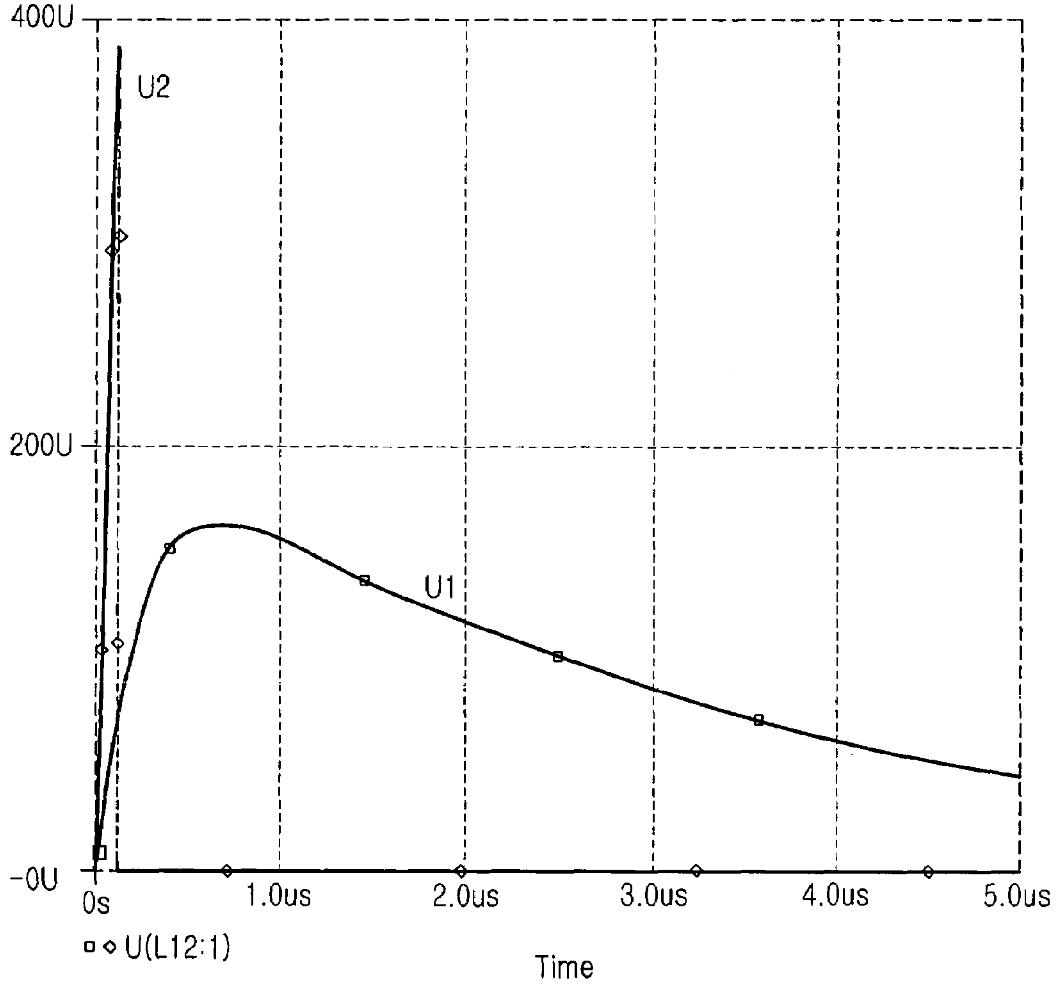
FIG. 3 is a graph illustrating an example of dependence of voltage at an input terminal 1 under the impact of overvoltages of two levels.

FIG. 3 shows first and second voltage impulses U1 and U2 occurring at the input terminal 1 under two voltages of different levels. The second impulse U2 shown in this figure represents a voltage occurring at the input terminal 1 when the voltage level exceeds the arrestor response voltage, whereas the first impulse U1 represents a voltage occurring at the input terminal 1 when the voltage level thereof does not cause the arrestor to respond.

Figure 4:
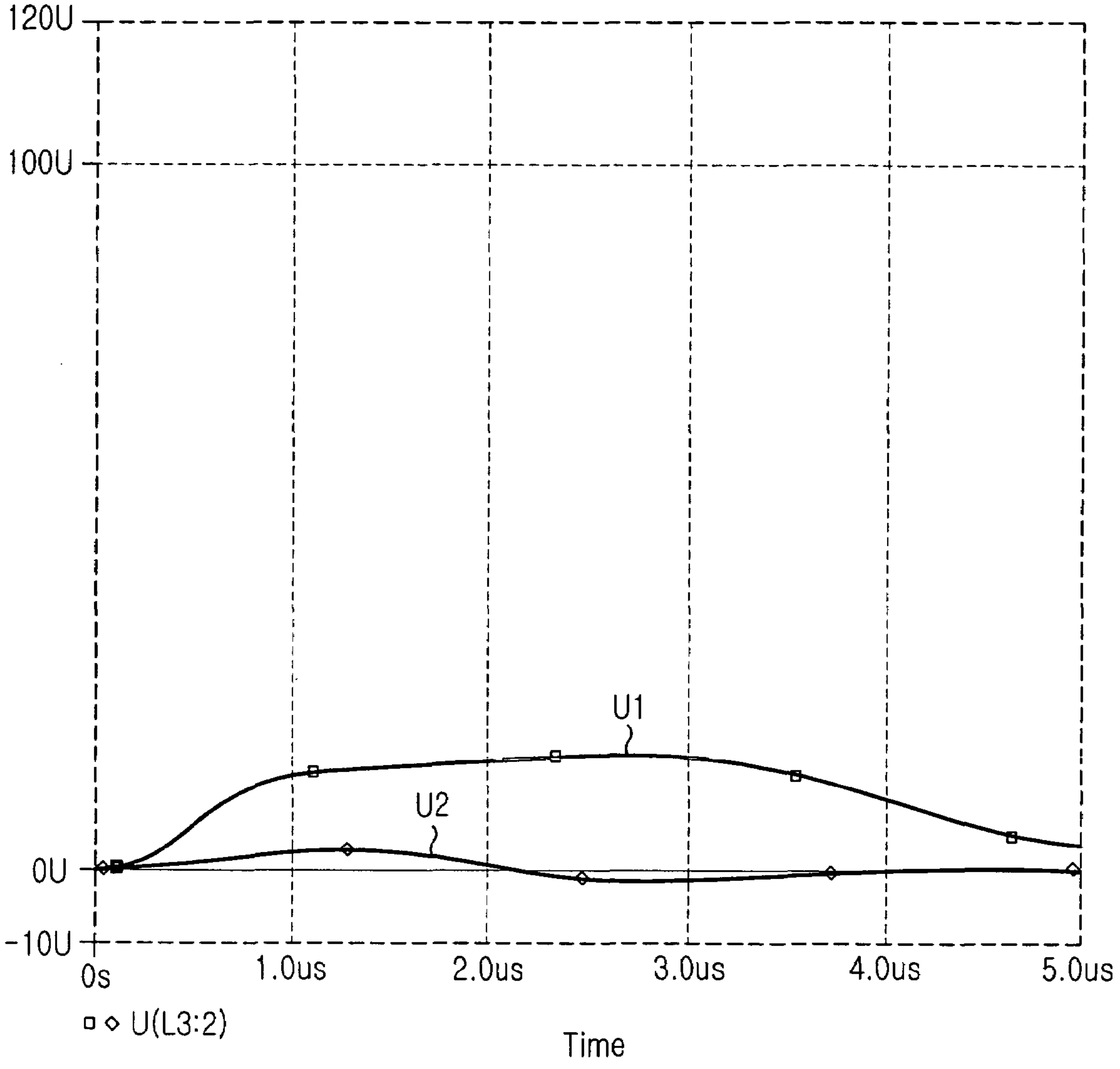
FIG. 4 is a graph illustrating an example of dependence of voltage at an input terminal 2 under the impact of overvoltages of two levels.

FIG. 4 shows two voltage impulses U1 and U2 occurring at the protected output terminal 2 when the two voltages as shown in FIG. 3 are applied to the input terminal 1.

If an overvoltage impulse greater than the conductivity threshold of the limiter 8 occurs in a feeding cable joint to the connector 1, the conductivity increases. This increase leads to current growth with an inconsiderable increase of voltage at the output terminal 2, which is shown by the first curve U1 in FIG. 4. A signal, whose current flows in through the limiter 8, causes voltage decrease at the inductance coil $L_1$ as the signal's voltage increases. Accordingly, the impulse amplitude increase at the input terminal 1 is not as steep as the first curve U1 in FIG. 3. An impulse occurring at the low frequency line 6 has a frequency substantially lower than the cut-off frequency of the high pass filter in the high frequency line 3. Thus, the voltage of a signal supplied through the low frequency line 6 is much lower than that of the input signal.

As the current impulse reaches a value intolerable to the limiter 8, the voltage fall at the first inductance coil $L_1$ allows the arrester 5 to respond. In other words, if a very high peak voltage occurs as the second curve U2 in FIG. 3, the arrestor 5 is activated. When the arrestor 5 is activated, the effecting impulse energy shifts towards the high frequency spectrum, so that the efficiency of its mitigation by the high pass filter of the low frequency line 6 rises. This results in a substantial reduction in the voltage amplitude at the output terminal 2, as the second curve U2 of FIG. 4.

The device for protection from impulse surges as described above is developed as an offset connection placed in a housing with N-Type thread connectors. A micro-strip board comprises foil-clad high frequency material RO4003 of 1 mm depth is mounted in the housing. The high frequency line comprises a 2.34 mm thick foil strip at two gaps of which high power high Q, ERF22X5C2H3R3CD01B (see Murata's catalogue "Chip Monolithic Ceramic Capacitors" Cat.No.C02E-8, p. 58) type capacitors are mounted. The second inductance coil $L_2$ comprises a microstrip section of 0.25 mm width foil, the other end of which is grounded, is linked to a node connecting the capacitors.

The λ/4 stubs $Z_1$ and $Z_2$ in the decoupling filters 4 and 7 comprise micro-strip sections of 1.5 mm and 0.5 mm foil, respectively. The first and third inductance coils $L_1$ and $L_3$ of the HPF comprise throttles B82111-E-C24 by EPCOS. A two-directional protective diode 1.5KE6V8CA is used as the voltage limiter 6.

As apparent from the above description, a surge protection device according to the embodiment of the present invention can prevent the negative impact of the high capacity of voltage limiters on high frequency channel characteristics. It is also possible to provide galvanic coupling of input to output needed to supply voltage of an antenna amplifier, while induced voltage impulses are limited in the circuit under protection at the minimum level.

Although the embodiments of the present invention have been disclosed for illustrative purposes, those skilled in the art will appreciate that various modifications, additions and substitutions are possible, without departing from the scope and spirit of the invention as set forth in the accompanying claims.

What is claimed is:

1. A surge protection device for protecting equipment from impulse surges, said device comprising a high frequency line, and a first decoupling filter formed as a λ/4 section and a gas arrestor, sequentially connected to the high frequency line, said gas arrestor being connected between the first decoupling filter and the ground, wherein said device further comprises:

a low frequency line and a second decoupling filter connected in series between an output terminal, through which a signal flows into a circuit, and a contact point between the first decoupling filter and the gas arrestor, said low frequency line including a low voltage limiter and a low pass filter; and a T-shaped high pass filer connected to the high frequency line.

2. The surge protection device according to claim 1, wherein the low voltage limiter includes a two-directional diode whose breakdown voltage is equal to a supply voltage to be provided to a circuit connected to the output terminal.

3. The surge protection device according to claim 1, wherein the low pass filter in the low frequency line is able to withstand voltage of surges occurring due to breakdown of the gas arrestor.

4. The surge protection device according to claim 1, wherein the high frequency line comprises a band pass filter.

5. The surge protection device according to claim 4, wherein the band pass filter comprises:

first and second strips, first and second capacitors and a first inductor disposed between the input and output terminals.

6. The surge protection device according to claim 5, wherein each of the first and second strips comprises a 2.34 mm thick foil strip.

7. The surge protection device according to claim 5, wherein one end of the first inductor is connected to the first and second strips and an opposing end of the conductor is connected to ground.

8. The surge protection device according to claim 1, wherein the impulse surge is between 100 and 200 volts.

9. The surge protection device according to claim 1, wherein the low frequency line further comprises:

third and fourth capacitors and second and third inductors.

10. The surge protection device according to claim 1, wherein an inductance of the second inductor selectively limits an input current.

11. The surge protection device according to claim 2, wherein the circuit connected to the output terminal comprises an antenna.

12. A surge protection device having a high frequency line, a gas arrestor and a first decoupling filter disposed between an input terminal and an output terminal, said surge protection device being adapted to protect a communication device from a high voltage, high frequency signal and from a high voltage low frequency signal, said surge protection device, comprising:

a low frequency line, adapted to divert a high voltage, high frequency signal from said high frequency line when said high voltage, high frequency signal is applied to said input terminal; and a second decoupling filter, adapted to filter said high voltage, low frequency signal from said low frequency line.

13. The surge protection device according to claim 12, wherein said low frequency line comprises a low pass filter.

14. The surge protection device according to claim 12, wherein said low frequency line comprises a first capacitor, a second capacitor, a first inductor and a second inductor, and a bidirectional diode.

15. The surge protection device according to claim 12, wherein said bidirectional diode selectively providing an input signal to ground or to said second decoupling filter.

16. The surge protection device according to claim 15, wherein said input signal is between 100 and 200 volts.

17. The surge protection device according to claim 16, wherein said input signal is an unwanted impulse signal.

18. A method of providing surge protection for a communication system, said method comprising:

detecting a presence of an impulse signal;

providing said impulse signal to a low frequency line if said impulse signal comprises a high voltage, low frequency signal; and providing said impulse signal to a high frequency line if said impulse signal comprises a high voltage, high frequency signal.

19. The method of claim 18, wherein the high frequency line includes a high pass filter and the low frequency line includes a low pass filter.

20. The method of claim 18, wherein the low pass filter includes a bi-directional diode having a breakdown voltage equal to a supply voltage of a circuit to be protected.

* * * * *